United States Patent [19]
Nakamura et al.

[11] Patent Number: 5,347,608
[45] Date of Patent: Sep. 13, 1994

[54] OPTICAL WAVEGUIDE AND OPTICAL WAVEGUIDE DEVICE

[75] Inventors: Masanori Nakamura; Yoshikazu Sakaguchi, both of Gifu, Japan

[73] Assignee: Ibiden Co., Ltd., Gifu, Japan

[21] Appl. No.: 68,102

[22] Filed: May 28, 1993

[30] Foreign Application Priority Data

Jun. 30, 1992 [JP] Japan .................................. 4-172989

[51] Int. Cl.$^5$ .............................................. G02B 6/10
[52] U.S. Cl. .................................... 385/130; 385/122; 385/2; 385/4; 385/8
[58] Field of Search ................ 359/332; 385/122, 129, 385/130, 142, 144, 2, 4, 8, 9

[56] References Cited

U.S. PATENT DOCUMENTS

| | | | |
|---|---|---|---|
| 4,093,781 | 6/1978 | Heinz et al. | 428/539 |
| 5,158,823 | 10/1992 | Enomoto et al. | 359/332 |
| 5,199,097 | 3/1993 | Shinokura et al. | 385/122 |

FOREIGN PATENT DOCUMENTS

| | | |
|---|---|---|
| 0444209 | 9/1991 | European Pat. Off. . |
| 9104360 | 4/1991 | World Int. Prop. O. . |

OTHER PUBLICATIONS

Ranganath, T. R. and Wang, Shyh, "Ti-Diffused LinbO3 Branched-Waveguide Modulators: Performance and Design", *IEEE Journal of Quantum Electronics*, vol. QE-13, No. 4 (1977), pp. 290–295.

Normandin, R.; So, V. C. Y.; Teh, G. A. and Stegeman G. I., "Optical Damage Thresholds of Thin-Film and In-diffused Waveguides", *Appl. Phys. Lett.* 34(3), Feb. 1, 1979, pp. 200–202.

Rottschalk, M.; Rasch, A. and Karthe, W., "Electrooptic Behaviour of Proton Exchanged LinbO3 Optical Waveguides", *Journal of Optical Communications*, 9 (1988), pp. 19–23.

*Journal of Crystal Growth*, "Epitaxial Growth of Ferroelectric Films for Optoelectronic (saw) Applications", to Neurgaonkar et al., vol. 84, 1987, pp. 409–412.

*Journal of Crystal Growth*, "Direct Measurement of Temperature Dependence of Lattice Mismatches Between LPE-growth Li(Nb,Ta) 03 Film and LiTa03 Substrate", vol. 46, No. 5, May 1979, pp. 607–614.

English language abstract of Japanese Patent Application No. 50-92300 Jul. 1975.
English language abstract of Japanese Patent Application No. 52-125286 Oct. 1977.
English language abstract of Japanese Patent Application No. 63 ∝ 195198 Jul. 1988.
English language abstract of Japanese Patent Application No. 2-12135 Jan. 1990.
English language abstract of Japanese Patent Application No. 2-18395 Jan. 1990.
English language abstract of Japanese Patent Application No. 4-12095 Jan. 1992.

*Primary Examiner*—Rodney B. Bovernick
*Assistant Examiner*—Stephen W. Barns
*Attorney, Agent, or Firm*—Sandler Greenblum & Bernstein

[57] ABSTRACT

Optical device including an optical waveguide composed of a LiTaO$_3$ monocrystalline substrate and a LiNbO$_3$ monocrystalline thin film waveguide formed on the surface of the substrate, with the lattice length of the LiNbO$_3$ monocrystalline thin film waveguide and the LiTaO$_3$ monocrystalline substrate being matched with each other, and an electrode provided on at least one of the branched sections of the waveguide extending along the optical axis thereof for changing a refractive index of the waveguide. The optical device having the optical waveguide has excellent electro-optic effects and a resistance to optical damage as well as an advanced modulation efficiency and a stable amplitude modulation.

14 Claims, 3 Drawing Sheets

OPTICAL WAVEGUIDE AND OPTICAL WAVEGUIDE DEVICE

BACKGROUND OF THE INVENTION

1. Field of the Invention

The present invention relates to an optical waveguide and an optical waveguide device. More particularly, it relates to an optical integrated circuit device used for an optical fiber communication system, an optical information processing system, an optical sensing system, an optical data registration system and the like, and in particular relates to those advantageously used as an optical switch and an optical modulator.

2. Description of the Related Art

Recently, a single mode optical fiber and a single wavelength laser have been progressed and as a result, a high speed optical data transmission of Gb/s has practically been utilized. In particular, the optical waveguide device, which is highly adapted for a single mode optical fiber, will in the future develop an optical fiber communication system.

To build up the optical fiber communication system, it is indispensable to use an optical device, such as an optical matrix switch, the optical modulator etc.

In an optical integrated circuit, such as optical matrix switch, optical modulator and the like, a Ti diffused $LiNbO_3$ channel waveguide is generally utilized. This comes from the reason that, $LiNbO_3$ has a relatively large electro-optic constant among other stable inorganic crystals and gives an advanced effect to the device using the electro-optic effect.

Hitherto, it has been well known that a Mach-Zehnder optical interferometer is constructed by using the optical waveguide, thereby producing the optical switch and the optical modulator, as reported in "IEEE, J.Quantum. Electron.", vol.QE-13, No.4, pp.290(1977) by T. R. RANGANATH et al.

However, for the Mach-Zehnder optical modulator proposed by NORMANDIN et al., as reported in "Appl. Phys. Lett.," vol.34, No. 3, pp.200(1979) by R. Normandin et al., and "J. Opt. Commun.," vol.9, No. 1 pp. 19(1988) by M. Rottschalk et al., (1) an $LiNbO_3$ optical waveguide produced by a Ti diffusion method suffers large optical damage due to its Ti content and accordingly a waveguide for visible light is not available, (2) an $LiNbO_3$ optical waveguide produced by a proton exchange method, after the waveguide has been formed, has a different crystalline characteristic from that of a virgin $LiNbO_3$, and together with the other reason, an electro-optic constant is smaller than that of a bulk crystal. Accordingly, when such an optical waveguide is used as the optical device for an optical directional coupler and an optical modulator, etc., then a problem has arisen in an inability to realize the electric-power-saving and the minituarization because a larger switching voltage and a longer effective length are required.

SUMMARY OF THE INVENTION

An object of the invention is to remove the aformentioned difficulties in an optical device such as an optical waveguide switch, optical modulator and the like, particularly Mach-Zehnder type optical device and its component, i.e., optical waveguide The present inventors have found that, following an intensive study for the above described problems which belong to the known Mach-Zehnder modulator, a lower electro-optic effect is caused from lattice mismatch between a substrate and a crystalline material forming the waveguide. Therefore, the problem is solved in that an optical waveguide having a superior electro-optic effect must be obtained by lattice match between the crystal of the substrate and the waveguide.

The optical waveguide according to the invention is produced in such a manner that, impurities, such as transition metal, etc., causing the optical damage are not added to an optical waveguide layer rather than the Ti diffusion method, therefore, the waveguide can be performed with a smaller optical damage without any optical loss even for a short wavelength.

Further, the optical waveguide according to the invention not only prevents diffusion of impurities, but also exhibits waveguide characteristics with no degradation after a temperature thereof rises up to around a Curie point of $LiNbO_3$ because heat resistance is obtained by lattice matching between the substrate and the waveguide. In the conventional Ti diffused $LiNbO_3$ waveguide or the proton exchanged $LiNbO_3$ waveguide, when the temperature rises up to the Curie point of the $LiNbO_3$, the Ti or proton is sufficiently diffused to change a waveguide mode profile or to eliminate a presence of the waveguide mode. However, according to the invention, such adverse effect is prevented.

The optical waveguide of the invention, which is constituted on the basis of the knowledge and the concept as described, is characterized in that, an $LiNbO_3$ monocrystalline thin film waveguide is formed on a surface of an $LiTaO_3$ monocrystalline substrate, concurrently a branch section is provided on a part of the thin film waveguide, and a lattice length of the $LiNbO_3$ monocrystalline thin film waveguide is matched to that of the $LiTaO_3$ monocrystalline substrate.

Further, it is an object of the invention to provide an optical waveguide device characterized in that, an $LiNbO_3$ monocrystalline thin film waveguide is Formed a surface of an $LiTaO_3$ monocrystalline substrate, concurrently branch sections are provided on a part of the thin film waveguide, and a lattice length of the $LiNbO_3$ monocrystalline thin film waveguide is matched to that of the $LiTaO_3$ monocrystalline substrate, and at least one of the branch sections of the waveguide is provided with an electrode for changing a refractive index of the waveguide.

Operation Mode of the Invention

The optical waveguide according to the invention is characterized in that an electrode for changing a refractive index (propagation constant) this waveguide is provided on a Y shaped branch of the $LiNbO_3$ monocrystalline thin film waveguide which is formed in or on the $LiTaO_3$ monocrystalline substrate, and a lattice length of the $LiTaO_3$ monocrystal substrate is matched to that of the $LiNbO_3$ monocrystalline thin film waveguide.

A face (0001) of the $LiNbO_3$ monocrystalline waveguide must be formed to be laminated on a face (0001) of the $LiTaO_3$ monocrystalline substrate.

In the above constitution, the matching of the lattice lengths of laminated monocrystals means that lattice length of the $LiNbO_3$ monocrystalline thin film is substantially coincident with that of an $LiTaO_3$ monocrystalline substrate; namely, is adjusted to be in a range of 99.81 to 100.07%, preferably 99.92 to 100.03% of the lattice length of the $LiTaO_3$ monocrystalline substrate.

With matching lattice lengths of both monocrystals as mentioned above, when a liquid phase epitaxial growth of the LiNbO$_3$ monocrystal is performed on the LiTaO$_3$ monocrystalline substrate, an occurrence of crystal defect is prevented, and as a result there is formed an LiNbO$_3$ monocrystalline thin film waveguide having an electro-optic effect equivalent to that of an LiNbO$_3$ monocrystalline bulk.

When the LiTaO$_3$ monocrystal is used as a substrate, the LiNbO$_3$ monocrystalline thin film exhibits an extremely superior optical characteristic if the lattice length of the LiNbO$_3$ monocrystalline thin film is matched with that of the substrate monocrystal, and furthermore there can be formed a thick film which has not been produced in the conventional technique.

A reason why the LiNbO$_3$ monocrystalline thin film exhibits such extremely advanced optical characteristics is that, the LiNbO$_3$ monocrystalline thin film and the LiTaO$_3$ monocrystal substrate are obtained by lattice match therebetween and formed unitary with each other to greatly reduce their strain and crystal defects, to thereby upgrade a crystalline characteristic, and as a result, a high qualitative film is formed without any micro cracks, etc.

In the construction mentioned above, a method of lattice matching both laminated monocrystals may preferably be a method which the inventors have proposed in the International Patent Application Number PCT/JP/90/01207. Namely, (1) a method of containing Na and Mg in the LiNbO$_3$ monocrystal; (2) a method of varying a ratio of Li and Nb in a range of 41/59 to 56/44; and (3) a method of reducing the lattice length of the LiTaO$_3$ monocrystalline substrate by doping Ti, etc. These described methods are satisfactorily in conformity with the method which the inventors have proposed in the specification.

These methods will now be described in detail.

(1) It is known in general that the lattice length of the LiTaO$_3$ monocrystalline substrate is larger than that of the LiNbO$_3$ monocrystal. If the LiNbO$_3$ monocrystal to be laminated is replaced with or doped by Na or Mg, that is to enlarge the lattice length of the LiNbO$_3$ monocrystal, then the lattice lengths of both monocrystals can be matched with each other without optical damage.

The LiNbO$_3$ monocrystalline thin film is preferably contained therein with Na and Mg, the contents of which may preferable be Na of 0.1 to 14.3 mol %, and Mg of 0.8 to 10.8 mol % for the LiNbO$_3$ monocrystal. The reason why the preferable content ranges of Na and Mg are decided is due to the fact that in case the Na content is less than 0.1 mol %, then irrespective of added quantity of Mg, the lattice length of the LiNbO$_3$ monocrystal is not enlarged enough to match that of the LiTaO$_3$ monocrystalline substrate, and when Na content exceeds 14.3 mol %, then the lattice length becomes too large. Thus in both cases the lattice match between LiNbO$_3$ monocrystal and the LiTaO$_3$ monocrystal becomes difficult. In case the Mg content is less than 0.8 mol %, then the optical damage can not be sufficiently prevented, and if it exceeds 10.8 mol %, then crystal of magnesium niobate is deposited, whereby Mg contents outside the described range are not preferable.

(2) According to the invention, a method of lattice-match between the LiNbO$_3$ monocrystal thin film and the LiTaO$_3$ monocrystalline substrate by changing a mol ratio of Li and Nb in LiNbO$_3$ may use the liquid phase epitaxy technique. In this case, it is advantageous to utilize a composition mainly consisting of K$_2$O, V$_2$O$_5$, Li$_2$O and Nb$_2$O$_5$. Such reason is that K$_2$O and V$_2$O$_5$ act as a melting agent (flux). By using the K$_2$O and V$_2$O$_5$ as a flux, supply of Li from the flux is prevented, thereby the mol ratio of Li and Nb in the LiNbO$_3$ to be separated can be varied by changing a composition ratio of the Li$_2$O and Nb$_2$O$_5$ in the raw material.

As a conclusion, the change of the mol ratio of the Li and Nb mol % provides variation of the lattice length "a" axis. The control of the composition ratio of the Li$_2$O and Nb$_2$O$_5$ in the raw material provides a control the lattice length of the "a" axis of the LiNbO$_3$ monocrystalline thin film, thus the lattice match between the LiNbO$_3$ monocrystal thin film and the LiTaO$_3$ monocrystalline substrate can be achieved.

(3) According to the invention, another lattice-match technique may be used to achieve the matching by reducing the lattice length of the "a" axis of the LiTaO$_3$ monocrystalline substrate layer. In this method, Ti may preferably be contained in the LiTaO$_3$ monocrystal, because Ti atom or ion acts to reduce the lattice length of the "a" axis of the LiTaO$_3$ monocrystalline substrate layer.

The Ti atom or ion in a range from 0.2 to 30 mol % for LiTaO$_3$ may preferably be contained in the LiTaO$_3$. The reason is that, if the Ti content is less than 0.2 mol %, then the lattice length of the LiTaO$_3$ is not reduced enough to match to that of the LiNbO$_3$, and if it exceeds 30 mol %, then, to the contrary, the lattice length is reduced too much, and therefore in both cases, cases, the lattice match between the LiTaO$_3$ monocrystalline substrate and the LiNbO$_3$ monocrystalline thin film is not achieved.

DETAILED DESCRIPTION OF THE PREFERRED EMBODIMENTS

A method of producing the waveguide will now be described.

Figure 2A:
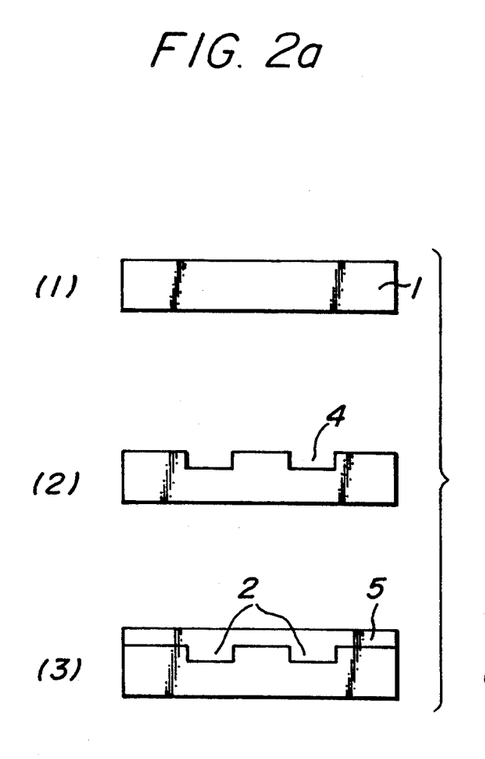
FIGS. 2(a) and 2(b) illustrates a process of producing an inverted ridge type optical waveguide according to the invention, and a process of producing a ridge type optical waveguide according to the invention, respectively.

(1) An inverted ridge Type Optical Waveguide:

Referring to FIG. 2(a) illustrating a method of forming the inverted ridge type optical waveguide 2, grooves 4 are formed in a LiTaO$_3$ monocrystalline substrate 1 and then a thin LiNbO$_3$ monocrystalline film 5 is grown on the substrate 1 with their lattices being matched with each other, after which a surplus portion of the thin film 5 is removed, and the LiNbO$_3$ monocrystal is remained only in the groove 4, thus the waveguide 2 is formed.

Figure 2B:
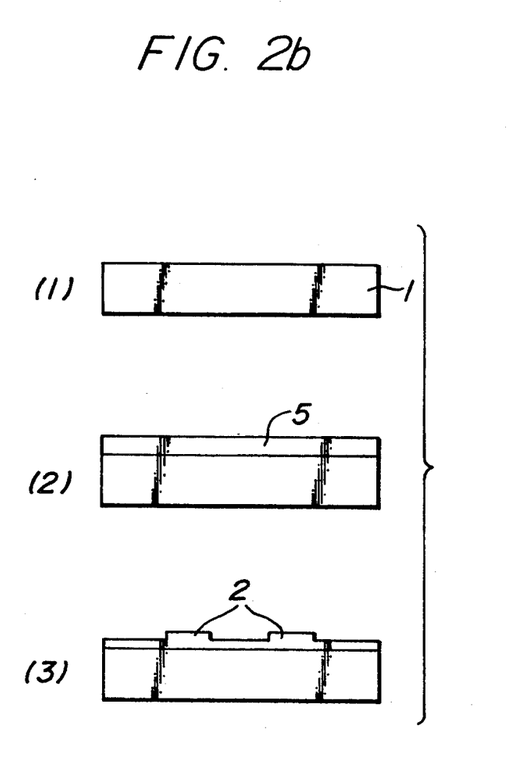
Figure 3A:
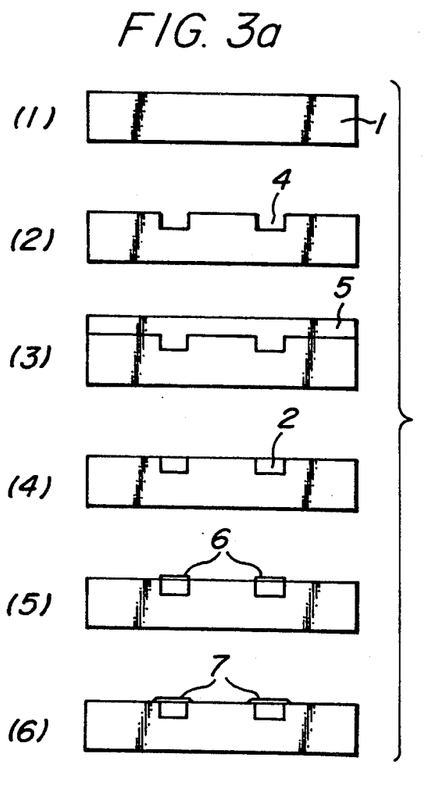
FIGS. 3(a) and 3(b) illustrates a process of producing an inverted ridge type optical modulator according to the invention and a process of producing a ridge type optical modulator according to the invention, respectively.
Figure 3B:
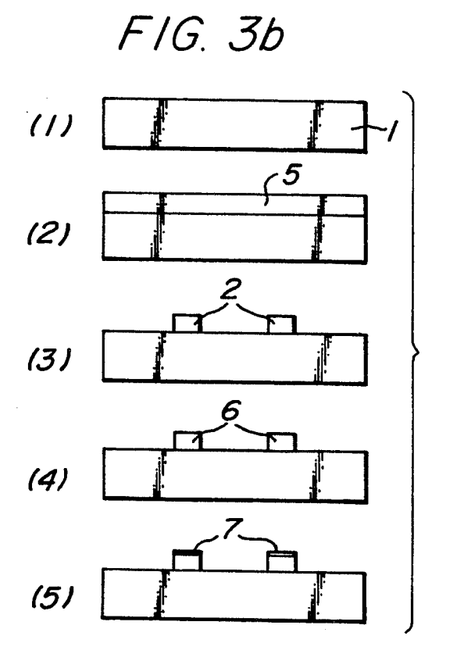

(2) A ridge type waveguide:

Referring to FIG. 2(b) illustrating a method of forming the ridge type waveguide 2, a thin LiNbO3 monocrystalline film 5 is grown on a LiTaO3 monocrystalline substrate 1 with their lattices being matched with each other, and then a surplus portion is removed by masking waveguide portions of the LiNbO3 monocrystalline film 5 with Ti, etc., and dry-etching the film to form the waveguide 2.

(3) The Others:

Another method of forming a thin LiNbO3 monocrystalline film 5 on the LiTaO3 monocrystalline substrate with their lattice being matched, includes step of contacting the LiTaO3 monocrystalline substrate with a melted compound consisting of lithium oxide, vanadium pentoxide, niobium pentoxide, sodium oxide and magnesium oxide.

Figure 1A:
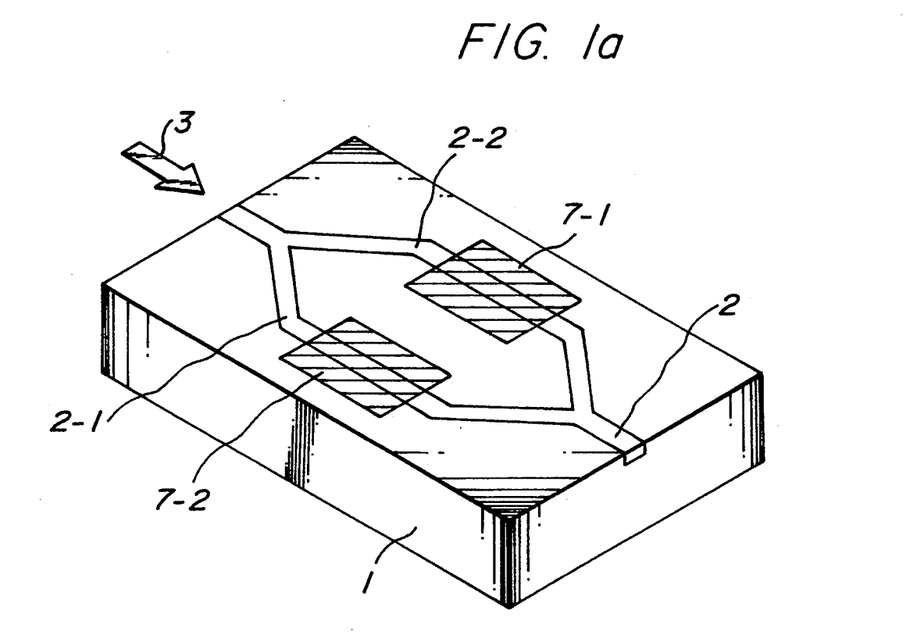
FIGS. 1(a) and 1(b) illustrate a schematic perspective view of an embodiment of an optical modulator according to the invention and a schematic perspective view of another embodiment of the invention, respectively.
Figure 1B:
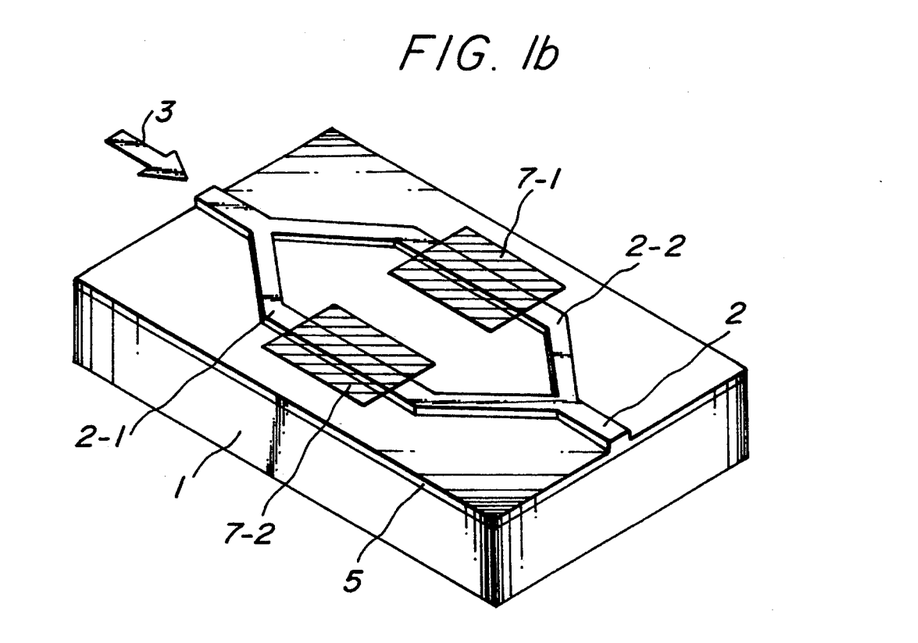

The invention is to provide further the other aspects; namely, by the inverted ridge type waveguide in the LiTaO3 monocrystalline substrate 1, as shown in FIG. 1(a); or by the ridge type waveguide on the substrate as shown in FIG. 1(b), a Mach-Zehnder optical interferometer is constituted as the optical device used for the optical modulator or the optical switch.

The optical modulator as described above is constructed to apply an electric field along the optical axis of the LiNbO3 monocrystalline thin film waveguide whose lattice is matched with that of the LiTaO3 monocrystalline substrate; such "optical modulator" is an optical device having a long range service life with a stable amplitude modulation, exhibiting a remarkably high efficiency for the optical modulation.

The optical device, i.e., the optical modulator according to the invention includes a channel type optical waveguide 2 which has two branched sections having optical axes 2-1 and 2-2 respectively, and Y shaped branching and confluent portions formed on the substrate 1 to form a one input-one output type, as shown in the drawing.

An operational principle of such a optical modulator will be described with reference to FIG. 1.

The optical modulator has a LiTaO3 monocrystalline substrate 1 and a branch type LiNbO3 monocrystalline waveguide 2 formed on the vicinity of a (0001) face of the LiTaO3 monocrystalline substrate 1, and at least a part of the waveguide is provided with two branched sections.

The waveguide described above must be formed to laminate the (0001) face of the branch type LiNbO3 monocrystalline waveguide on the (0001) face of the LiTaO3 monocrystalline substrate 1. The lattice length of the "a" axis of the LiTaO3 monocrystalline substrate is matched with that of the "a" axis of the LiNbO3 monocrystalline thin film waveguide.

Electrodes 7-1 and 7-2 having suitable constructions are provided on the LiNbO3 monocrystalline waveguides 2-1 and 2-2, and adopted for inducing a change of a refraction index of the waveguide by the electro-optic effect of the LiNbO3 monocrystalline waveguide to control a phase of a guided light electrically and intensity of an output light with voltage applied to the electrodes.

Electrodes 7-1 and 7-2 are preferably planer electrodes which may be enough to be formed on at least one of the branched waveguides sections. But, an electrode may preferably be formed on each branched waveguide section.

In the construction as described above, the guided light is separated into two lights at the Y branch of an input-side, and guided to the optical waveguides 2-1 and 2-2. At least one-side of the branched optical waveguides 2-1 and 2-2 is provided thereon with a suitably constructed electrode, and a phase difference $\Delta\phi$ (this is a phase difference generated between the two waveguides due to variation, such as an increase or a decrease of a propagation constant of the waveguide because an electric field concentration, is produced beneath the electrode when the voltage is applied to the electrode) is produced between the two waveguides by applied voltage. The two guided lights having the phase difference with each other are allowed to be interfered at an output-side branch, the intensity of output light is varied depending on the phase difference $\Delta\phi$. In case where each of the Y branched waveguides are formed with electrodes, then the guided lights respectively receive phase variations of $\Delta\phi$ and $\Delta\phi$ in the branched waveguides, accordingly the phase difference between the waveguides becomes $2\Delta\phi$, this indicates two times the phase difference can be obtained with a high efficiency compared to the case that the electrode is provided only on either-side waveguide. The phase difference produced between the two waveguides is given in the following equation, $$2\Delta\phi = \pi \frac{V}{V\pi} \quad V\pi = \frac{\lambda d}{2\Gamma n_e^3 r_{33} l} \quad (1)$$

where $V\pi$ represents a half wavelength voltage (a voltage where a phase difference becomes $\pi/2$), "1" an effective length of the electrode, "d" an interval between the electrodes, $\Gamma$ a reduction coefficient of the applied voltage, $\lambda$ a wavelength of the guided light, "r" an electro-optical constant of the LiNbO3 monocrystalline thin film, and V an applied voltage.

When a light with power $P_i$ is coupled, an output light $P_o$ satisfies the following equation, $$P_o = \frac{P_i}{2}\left\{ \frac{(1-\sqrt{r_p})^2}{1+r_p} + 4\frac{\sqrt{r_p}}{1+r_p}\cos^2\left(\frac{\pi}{2}\frac{V}{V_p}\right) \right\} \quad (2)$$

where $r_p$ represents a power distribution ratio of each waveguide.

As shown in the equations (1) and (2), a phase difference $\Delta\phi$ is given and an intensity of the outpost light is modulated by varying the voltage applied to the electrode.

When $\Delta\phi$ is $\pi/2$, then the two guided lights are interfered with each other and varnished, and as a result, turning ON and OFF of the guided light becomes available.

A method of producing such optical modulation will be described as the following.

As a method of producing the LiNbO3 monocrystalline thin film there can be used; namely, one comprising the steps of forming a groove in the waveguide formed portion of the LiTaO3 monocrystalline substrate 1, forming the LiNbO3 monocrystalline thin film while being allowed to receive lattice match, thereafter removing a surplus portion so that the LiNbO3 monocrystal 5 remains only in the groove 4, thereby forming the waveguide 2; and the other comprising the steps of forming the LiNbO3 monocrystalline film on the LiTaO3 monocrystalline substrate 1 while both being allowed to receive lattice match, thereafter removing a surplus portion by using Ti and the like, and dry-etching on the waveguide formed portion, thus forming the waveguide 2.

The method of forming the LiNbO$_3$ monocrystalline thin film while being allowed to receive lattice match, is achieved by contacting the LiTaO$_3$ monocrystalline substrate 1 with a melted body consisting of lithium oxide—vanadium pentoxide—niobium pentoxide—sodium oxide—magnesium oxide.

An electrode 7-1 is provided as a means for changing a refractive index on the LiNbO$_3$ monocrystalline waveguide 2 produced in the above described process. An electrode 7-2 may preferably be produced by coating metal film such as aluminium or gold by evaporation, plating or sputtering.

A buffer layer 6 such as alumina or silica be provided between the waveguides 2-1, 2-2 and the electrodes 7-1, 7-2.

The waveguide according the invention becomes a single mode waveguide under the condition as described below.

If the LiNbO$_3$ waveguide includes an Na content in a range of 0.1 to 14.3 mol % and an Mg content in a range of 0.8 to 10.8 mol %, then the relationships in the following equations are preferable,
in case of TM mode, $$1.9 < (T+0.7)/\lambda < 5.7$$

in case of TE mode, $$0.29 < (T+0.04)/\lambda < 1.19$$

where T($\mu$m) represents a thickness of the waveguide, and $\lambda$ ($\mu$m) a wavelength of the waveguide.

A condition of the signal mode of the ridge type waveguide establishes the following relationship, in case of TM mode, $$W \leq (4\lambda - 0.5)(\lambda^2 \, 10T + 2.0)$$

in case of TE mode, $$W \leq (0.04\lambda^3 + 0.1 \, \lambda^2)/\Delta T + 2.5\lambda$$

where W($\mu$m) represents a width of the waveguide. $\Delta$T($\mu$m) represents a step (level difference) of the ridge portion.

The range described above is a particular condition for the LiNbO$_3$ waveguide which is lattice matched to the LiTaO$_3$ substrate using Na and Mg.

DETAILED DESCRIPTION OF THE PREFERRED EMBODIMENT

EXAMPLE 1

(1) 2 mol % of MgO with respect to a theoretical quantity of LiNbO$_3$ which could be separated from a melted body composition was added to a mixture consisting of Na$_2$CO$_3$ 22 mol %, Li$_2$CO$_3$ 28 mol %, V$_2$O$_5$ 40 mol % and Nb$_2$O$_5$ 10 mol %, a resultant mixture was put into a platinum crucible, and the mixture in the crucibients was heated up to 1100° C. and melted under an air atmosphere within an epitaxial growth forming system. The resultant obtained melt in the crucible was stirred at 100 rpm for 12 hours by means of a propeller.

(2) A (0001) face of an LiTaO$_3$ monocrystal having a thickness of 2 mm was polished to prepare a substrate. Next, a portion of the surface of the LiTaO$_3$ monocrystal substrate to be formed with the waveguide as shown in FIG. 1 was patterned by a photolithography technique and masked by a Ti strip line formed by a lift-off method. Further, a groove having a width of 10 $\mu$m and a depth of 3.5 $\mu$m was formed by an Ar plasma etching technique and the Ti mask was peeled off.

(3) Next, the melt was gradually cooled down to 915° C. at a cooling rate of 60° C. per hour, and the substrate 1 was preliminarily heated at 915° C. for 30 minutes, and then dipped and rotated at 30 rpm for 4 minutes in the melt. A growth rate of the LiNbO$_3$ was 1 mm per minute.

(4) The substrate 1 was taken up from the melt, and rotated at 1000 rpm for 30 seconds to shake away a surplus melt medium from the substrate. Thereafter, the substrate was gradually cooled to room temperature at a cooling rate of 1° C. per minute. Thus, an LiNbO$_3$ monocrystalline thin film containing Na and Mg of about 4 $\mu$m thickness was formed on the substrate.

(5) The Na and Mg contents contained in the thus obtained LiNbO$_3$ monocrystalline thin film are 3 mol % and 2 mol % respectively. A lattice length ("a" axis) of the thin film was 5.156, and an extraordinary refractive index measured by a guided light with a wavelength of 0.83 $\mu$m was 2.163$\pm$0.001.

(6) The optical waveguide thus produced was coupled to a laser beam of a wavelength of 1.55 $\mu$m at TM mode. Its waveguide mode was a single one, and a propagation loss measured by a prism coupling method was less than 1 dB per cm. A deterioration with age of an emitting light was measured, and as a result, no variation was found at least for 24 hours.

(7) Further, this optical waveguide was kept at 1000° C. for 12 hours in a water vapor atmosphere, and was coupled to the laser with the wavelength of 1.55 $\mu$m at TM mode. Its waveguide mode was a single one with a propagation loss of less than 1 dB per cm. A deterioration with age of an emitting light was not changed at least for 24 hours as a result of measurement.

(8) A silica buffer layer was placed on the optical waveguide obtained in the above process by sputtering technique, and an aluminium electrode was formed on the waveguide by the photolithography and vapor deposition techniques. An electro-optic constant (r 33) of this optical waveguide was 30 pm/V, which was substantially equal to a value of a bulk LiNbO$_3$ monocrystal as a result of a practical measurement.

EXAMPLE 2

(1) 5 mol % of MgO with respect to a theoretical quantity of LiNbO$_3$ which could be separated from the melted body composition was added to a mixture consisting of Li$_2$CO$_3$ 44.3 mol %, V$_2$O$_5$ 46.4 mol %, Nb$_2$O$_5$ 9.3 mol %, and Na$_2$CO$_3$ 27.2 mol % relative to Li$_2$CO$_3$, a resultant mixture was put into a platinum crucible, and the mixture was heated up to 1050° C. and melted under the air atmosphere within the epitaxial growth forming system. The resultant obtained melt in the crucible was stirred at 100 rpm for 20 hours by means of a propeller.

(2) A (0001) face of an LiTaO$_3$ monocrystal with a thickness of 1 mm was polished to prepare a substrate. Next, a portion where a waveguide 2 was formed, as shown in FIG. 1, was patterned by the photolithography technique and was masked with Ti formed by a lift-off method. Further, a groove with a width of 1.5 μm and a depth of 0.8 μm was formed by the Ar plasma etching technique and the Ti mask was peeled off.

(3) Next, the melt was gradually cooled down to 938° C. at a cooling rate of 60° C. per hour, and concurrently the substrate 1 was preliminarily heated at 915° for 30 minutes, and then dipped and rotated at 35 rpm for 2.5 minutes in the melt. A growth rate of the LiNbO$_3$ was 1.6 μm per minute.

(4) The substrate 1 was taken up from the melt, and rotated at 1000 rpm for 30 seconds to shake away surplus melt from the substrate. Thereafter, the substrate was gradually cooled to the room temperature at a cooling rate of 1° C. per minute. Thus, an LiNbO$_3$ monocrystalline thin film with sodium and magnesium contents of about 4 μm thickness was formed on the substrate.

(5) When the waveguide thus produced was coupled to laser beam at TM mode with a wavelength of 0.515 μm, then the waveguide mode was a single one, its propagation loss was less than 1 dB per cm. A deterioration with age of an emitting light was measured, where no variation was found at least during 24 hours.

(6) Further, the optical waveguide was kept at 1000° C. or 12 hours in the water vapor atmosphere, and was coupled by at laser beam at TM mode with a wavelength of 0.515 μm, where its waveguide mode was a single one with a propagation loss of less than 1 dB per cm. It has been found as a result of measurement that a deterioration with age of an emitting light was not changed at least during the time of 24 hours.

(7) A silica buffer layer was placed on the optical waveguide 2 obtained in the above process by sputtering technique, and an aluminium electrode was formed on the waveguide by the photolithography and vapor deposition technique. An electro-optic constant (r33) of this optical waveguide was 30 pm/V, which was substantially equal to a value of a bulk LiNbO$_3$ monocrystal as a result of a practical measurement.

EXAMPLE 3

(1) 5 mol % of MgO with respect to a theoretical quantity of LiNbO$_3$ which could be separated from the melted body composition was added to a mixture consisting of Li$_2$CO$_3$ 40.5 mol %, V$_2$O$_5$ 50.5 mol %, Nb$_2$O$_5$ 9.0 mol %, and Na$_2$CO$_3$ 23.4 mol % relative to Li$_2$CO$_3$, a resultant mixture was put into a platinum crucible, and the mixture in the crucible was heated up to 1050° C. and the crucible melted under the air atmosphere within the epitaxial growth forming system. The resultant obtained melt in the crucible was stirred at 100 rpm for 19 hours by means of a propeller.

(2) A (0001) face of an LiTaO$_3$ monocrystal having a thickness of 2 mm was polished to prepare a substrate.

(3) Next, the melt was gradually cooled down to 915° C. at a cooling rate of 60° C. per hour, and concurrently the substrate was preliminarily heated at 938° C. for 30 minutes, and then dipped in the melt for 2.5 minutes with being rotated at a rotating speed 20 rpm. A growth rate of the LiNbO$_3$ was 1.6 μm per minute.

(4) The substrate 1 was taken up from the melt as described above, rotated at a rotating speed of 1000 rpm for 30 seconds to shake away a surplus melt from the substrate. Thereafter, the substrate was gradually cooled to the room temperature at cooling rate of 1° C. per minute, as a result, an LiNbO$_3$ monocrystalline thin film with Na and Mg contents of about 4 μm thickness has been formed on the substrate.

(5) The Na and Mg contents contained in the thus obtained LiNbO$_3$ monocrystalline thin film were 3 mol % and 2 mol % respectively. A lattice length ("a" axis) the thin film was 5.756A, a extraordinary refractive index measured by a guided light with a wavelength of 0.83 μm was 2.163±0.001.

(6) A propagation loss of the slab type waveguide thus obtained was measured by a prism coupling method, where a propagation loss was less than 1 dB per cm at a TM mode with a wavelength of 0.83 μm.

(7) A Ti mask was produced by a photolithography and sputtering technique as mentioned above, and a ridge type channel waveguide was produced by the Ar plasma etching. The waveguide shape had a width of 10 μm with an etching depth of 1 μm.

(8) The optical waveguide thus produced was coupled to a laser beam of a wavelength of 1.55 μm at mode. Its waveguide mode was a single one, and a propagation loss measured by a prism coupling method found to be equal to a value of the slab waveguide. A deterioration with age of an emitting light measured, where no variation was found at least for 24 hours.

(9) Further, this optical waveguide was kept at 1000° C. for 12 hours in a water vapor atmosphere, and was coupled to the laser with the wavelength of 1.55 μm at TM mode. Its waveguide mode was a single one with a propagation loss of less than 1 dB per cm. A deterioration with age of an emitting light was not changed at least for 24 hours as a result measurement.

(10) A silica buffer layer was placed on the optical waveguide 2 obtained in the above process by sputtering technique, and an aluminium electrode was formed on the waveguide by the photolithography and vapor deposition technique. An electro-optic constant (r33) of this optical waveguide was 30 pm/V, which was substantially equal to a value of a bulk LiNbO$_3$ monocrystal as a result of a practical measurement.

EXAMPLE 4

(1) 5 mol % of MgO with respect to a theoretical quantity of LiNbO$_3$ which could be separated from a melted body composition was added to a mixture consisting of Li$_2$CO$_3$ 39.7 mol %, V$_2$O$_5$ 46.0 mol %, Nb$_2$O$_5$ 14.3 mol %, and Na$_2$CO$_3$ 14.5 mol % relative to Li$_2$CO$_3$, a resultant mixture was put into a platinum crucible, and the mixture in the crucible was heated up to 1050° C. and melted under the air atmosphere within the epitaxial growth forming system. The resultant obtained melt in the crucible was stirred at 100 rpm for 21 hours by means of a propeller.

(2) For a substrate, a (0001) face of an LiTaO$_3$ monocrystal with a thickness of 1 mm was polished.

(3) Next, the melt was gradually cooled down to 940° C. at a cooling rate of 60° C. per hour, and concurrently the substrate 1 was preliminarily heated at 940° C. for 30 minutes, and then dipped for 1 minute into the melt while with being rotated at 25 rpm. A growth rate of the $LiNbO_3$ was 1 $\mu m$ per minute.

(4) The substrate 1 was taken up from the melt, and rotated at 1000 rpm for 30 seconds to shake away a surplus melt from the substrate. Thereafter the substrate was gradually cooled to a room temperature at a cooling rate of 1° C. per minute. Thus, $LiNbO_3$ monocrystalline thin film containing Na and Mg of about 1 $\mu m$ thickness was formed on the substrate.

(5) The Na and Mg contents contained in the thus obtained $LiNbO_3$ monocrystalline thin film were 3 mol % and 2 mol % respectively. A lattice length ("a" axis) of the thin film was 5.156Å, an extraordinary refractive index measured by an incident light with a wavelength of 0.83 $\mu m$ was $2.163 \pm 0.001$.

(6) A propagation loss of the slab type waveguide thus obtained was measured by the prism coupling method, where a propagation loss was less than 1 dB per cm in TM mode with a wavelength of 0.83 $\mu m$.

(7) A Ti mask is produced by patterning the waveguide in the above, and a ridge type channel waveguide is produced by the Ar plasma etching. The waveguide shape has a width of 1.5 $\mu m$ with an etching depth of 0.5 $\mu m$.

(8) The optical waveguide thus produced was coupled to a laser beam of a wavelength of 0.515 $\mu m$ at TM mode. Its waveguide mode was a single one, and a propagation loss measured by a prism coupling method was less than 1 dB per cm. A deterioration with age of an emitting light was measured, and as a result, no variation was found at least for 24 hours.

(9) Further, this optical waveguide was kept at 1000° C. for 12 hours in a water vapor atmosphere, and was coupled to the laser with the wavelength of 0.515 $\mu m$ at TM mode. Its waveguide mode was a single one with a propagation loss of less than 1 dB per cm. A deterioration with age of an emitting light was not changed at least for 24 hours as a result of measurement.

(10) A silica buffer layer was placed on the optical waveguide obtained in the above process by sputtering technique, and an aluminium electrode was formed on the waveguide by the photolithography and vapor deposition techniques. An electro-optic constant ($r_{33}$) of this optical waveguide was 30 pm/V, which was substantially equal to a value of a bulk $LiNbO_3$ monocrystal as a result of a practical measurement.

COMPARATIVE EXAMPLE 1

(1) Ti was formed by a photolithography and a sputtering techniques with a thickness of approximately 100Å on a Z face position of an $LiNbO_3$ monocrystal plate having a C axis in a thickness direction and having a size of about $5 \times 15$ mm with a thickness of 0.5 mm, the position on such Z face being the same as when the waveguide was formed in the embodiment 1, and thereafter thermal treated at 1000° C. for 10 hours in the water vapor atmosphere, Ti was thermal diffused. Thus, an optical waveguide was formed.

(2) The optical waveguide thus produced was coupled to a laser beam with a wavelength of 0.515 $\mu m$ at TM mode, then an emitting light became unstable after several seconds had lapsed, after all output intensity of the guided light was not detected.

COMPARATIVE EXAMPLE 2

(1) Ti was formed by a photolithography and a sputtering techniques with a thickness of approximately 100Å on a Z face position of an $LiNbO_3$ monocrystal plate having a C axis in a thickness direction and having a size of about $5 \times 15$ mm with a thickness of 1 mm, the position on such Z face being the same as when the waveguide was formed in the embodiment 1, and thereafter thermal treated at 1000° C. for 10 hours in the water vapor atmosphere, Ti was thermal diffused. Thus, an optical waveguide was formed.

(2) The optical waveguide thus produced was coupled to a laser beam with a wavelength of 1.55 $\mu m$ at TM mode, where the waveguide mode was a single one, and a propagation loss was less than 1 dB per cm.

(3) This waveguide was kept at 1000° C. for 12 hours in the water vapor atmosphere, and again coupled to a laser beam with the wavelength of 1.55 $\mu m$ at the TM mode. In this process, no output intensity of the guided light was found.

COMPARATIVE EXAMPLE 3

(1) For a substrate, a (0001) face of an $LiTaO_3$ monocrystal with a thickness of 2 mm was polished, thereafter as shown in FIG. 1, a groove was formed on a portion where the waveguide 2 was formed. The size of the groove and the like were made the same as in the example 1.

(2) A mixture consisting of $Li_2CO_3$ 50 mol %, $V_2O_5$ 40 mol %, and $Nb_2O_5$ 10 mol % was heated to 1000° C. and made a melt.

(3) Next, this melt was gradually cooled to 915° C. at a cooling rate of 60° C. per hour, concurrently the substrate 1 was preliminary heated at 915° C. for 30 minutes, then dipped into the melt and rotated at 30 rpm for 4 minutes. A growth rate of the $LiNbO_3$ was 1 $\mu m$ per minute.

(4) The substrate was taken up from the melt described above, and then rotated at 1000 rpm for 30 seconds to shake away a surplus melt from the substrate. Thereafter, the substrate gradually cooled to the room temperature at a cooling rate of 1° C. per minute, as a result, an $LiNbO_3$ monocrystalline thin film with a thickness of about 4 $\mu m$ was formed on the substrate.

(5) A propagation loss of the slab waveguide measured by the prism coupling method was 10 dB per cm at a TM mode with a wavelength of 0.83 $\mu m$.

(6) A surplus portion of the $LiNbO_3$ monocrystalline thin film was etched by the ion beam form a ridge type $LiNbO_3$ monocrystalline waveguide. A shape of the waveguide had a width of 10 $\mu m$ with an etching depth of 1 $\mu m$.

(7) The optical waveguide thus produced was coupled to a laser beam with a wavelength of 1.55 $\mu m$ at TM mode, where the waveguide mode was a single one and a propagation loss was 10 dB per cm equal to a value of the slab waveguide. A deterioration with age of an emitting light was measured, no variation was found at least for 24 hours.

(8) A silica buffer layer was placed on the optical waveguide 2 obtained in the above process by sputtering technique, and aluminium electrode was formed on the waveguide by the photolithography and vapor deposition technique. The optical waveguide was measured of its electro-optic constant, which was 3 pm/V, which was found to be equal to 1/10 the value of the bulk $LiNbO_3$ monocrystal.

COMPARATIVE EXAMPLE 4

(1) For a substrate 1, a (0001) face of an $LiTaO_3$ monocrystal of a thickness of 2 mm was polished for preparation, and chemical etched, thereafter, as shown in FIG. 1, a groove was formed on a portion where the waveguide 2 is formed. A size of the groove and the like were made the same design as in Example 1.

(2) A mixture material consisting of $Li_2CO_3$ 50 mol %, $V_2O_5$ 40 mol %, and $Nb_2O_5$ 10 mol % was heated to 1000° to form a melt.

(3) Next, this melt was gradually cooled to 915° C. at a cooling rate of 60° C. per hour, concurrently the substrate 1 was preliminary heated at 915° C. at least for 30 minutes, then dipped into the melt and rotated at 30 rpm for 4 minutes to be gradually cooled. A growth rate of the $LiNbO_3$ was 1 μm per minute.

(4) The substrate 1 was taken up from the melt, and then rotated at 1000 rpm for 30 seconds to shake away a surplus melt from the substrate. Thereafter the substrate was gradually cooled to the room temperature at a cooling rate of 1° C. per minute, as a result, an $LiNbO_3$ monocrystalline thin film with a thickness of about 4 μm has been formed on the substrate material.

(5) A propagation loss of the slab waveguide obtained measured by the prism coupling method was 10 dB per cm with a wavelength of 0.83 μm at a TM mode.

(6) A surplus portion of the $LiNbO_3$ monocrystalline thin film was etched by the ion beam to form a ridge type $LiNbO_3$ monocrystalline waveguide. A shape of the waveguide had a width of 10 μm with an etching depth of 1 μm.

(7) The optical waveguide thus produced was coupled to a laser beam with a wavelength of 1.55 μm at TM mode, where the waveguide mode was a single one and a propagation loss was 10 dB per cm equal to a value of the slab waveguide. A deterioration with age of an emitting light was measured, no variation was found at least for 24 hours.

(8) When this optical waveguide was kept at 1000° C. for 12 hours in the water vapor atmosphere, a crack occurred on the film.

COMPARATIVE EXAMPLE 5

(1) A Z face of an $LiNbO_3$ monocrystalline substrate having a C axis in a thickness direction and having a size of about 5×15 mm with a thickness of 0.5 mm was formed with Ta mask of a thickness of approximately 1 μm a width of 3 μm, and pattern by a photolithography, RIE techniques.

The resultant of the above process was dipped in $H_4P_2O_7$ and treated at 250° C. for 30 minutes, Ta was then peeled off, thus the proton-exchanged waveguide was formed.

(2) The optical waveguide thus produced was coupled a laser beam with a wavelength of 1.55 μm at TM mode, where its the waveguide mode was a single one and a propagation loss was 3 dB per cm.

(3) This waveguide was kept at 1000° C. during 12 hours in the water vapor atmosphere and again coupled to a laser beam with the wavelength of 1.55 μm at a TM mode. In this process, no output intensity of the guided light was found.

Table 1 shows a comparison of the measured results with respect to the respective characteristics of the examples 1, 2, 3, and 4 and the comparative examples 1, 2, 3, 4 and 5.

As apparent from a result shown in Table 1, the optical waveguide according to the invention can exhibit a superior characteristic than the conventional optical waveguide. More specifically, in the waveguide of the invention, since the lattice length is matched between the $LiNbO_3$ monocrystalline waveguide 2 and the $LiTaO_3$ crystal 1, then lattice defects are not formed in the $LiNbO_3$ monocrystalline waveguide 2. Further, unlike the case of the diffused optical waveguides such as the Ti diffusion $LiNbO_3$ optical waveguide and the proton exchanged optical waveguide and the like, in the optical waveguide according to the invention, impurity to form the waveguide is not diffused, thus resulting in an upgraded anti-annealing characteristic.

"Nothing" in the column of "After Anneal" indicates that, after the annealing, there did not arise various deteriorations of the waveguide characteristics such as degradation of electric-optic effect on a crack occurrence and the like.

TABLE 1

| Example Comparative Example | Waveguide Wavelength | mode | Anti-Optical Damage | Electro-Optical Constant | After Anneal |
|---|---|---|---|---|---|
| Example | | | | | |
| 1 | 1.55 | TM Single | No | Equal to Bulk | Nothing |
| 2 | 0.515 | TM Single | No | Equal to Bulk | Nothing |
| 3 | 1.55 | TM Single | No | Equal to Bulk | Nothing |
| 4 | 0.515 | TM Single | No | Equal to Bulk | Nothing |
| Comparative Example | | | | | |
| 1 | 0.515 | TM Single | Yes | Fail to Measure | — |
| 2 | 1.55 | TM Single | No | Fail to Measure | No waveguide |
| 3 | 1.55 | TM Single | No | 1/10 Bulk | — |
| 4 | 1.55 | TM Single | No | 1/10 Bulk | Crack |
| 5 | 1.55 | TM Single | No | 1/10 Bulk | No Waveguide |

EXAMPLE 5

(1) 2 mol % of MgO with respect to a theoretical quantity of $LiNbO_3$ which could be separated from a melted body composition was added to a mixture consisting of $Na_2CO_3$ 22 mol %, $Li_2CO_3$ 28 mol %, $V_2O_5$ 40 mol % and $Nb_2O_5$ 10 mol %, a resultant produced mixture was put into a platinum crucible, and heated up to 1100° C. in the air atmosphere within the epitaxial growth forming system.

The resultant obtained melt was stirred at 100 rpm for 12 hours by means of a propeller.

(2) A (0001) face of an LiTaO₃ monocrystal with a thickness of 2 mm was polished. Next, a groove was formed by the ion beam etching on a portion where the waveguide 2 was formed, as shown in FIG. 1. The groove was of a rectangular shape having a width of 8 μm with a depth of 1 μm, and a branch angle was 1.5°.

The melt was gradually cooled down to 915° C. at a cooling rate of 60° C. per hour, and then this substrate was preliminarily heated at 915° C. for 30 minutes, thereafter dipped and rotated at 100 rpm for 8 minutes. A growth rate of the LiNbO₃ was 1 μm per minute.

(3) The substrate 1 was taken up from the melted body, and a surplus melt was shaken away by rotating the by substrate at 1000 rpm for 30 seconds. Thereafter the substrate gradually cooled to the room temperature at cooling rate of 1° C. per minute. As a result, an LiNbO₃ monocrystalline thin film with Na and Mg contents of a thickness of about 5 μm was formed on the substrate.

(4) The Na and Mg contents in the obtained LiNbO₃ monocrystalline thin film were 3 mol % and 2 mol % respectively. A lattice length ("a" axis) of the thin film was 5.156, a extraordinary refractive index measured by a guided light with a wavelength of 0.83 μm was 2.164±0.001.

(5) Further, a surplus portion was removed by grinding the LiNbO₃ monocrystalline thin film. Thus, an embedded type LiNbO₃ monocrystalline waveguide with a depth of 4 μm was formed.

(6) A silica buffer layer was placed on the optical waveguide 2 obtained in the above process by sputtering technique, and aluminium electrode 7 was formed on the waveguide by the photolithography and vapor deposition techniques. An electro-optic constant (r 33) of this optical waveguide was 30 pm/V, which was substantially equal to a value of a bulk LiNbO₃ monocrystal as a result of a practical measurement. The electrode shape was a planer electrode construction having a lengthy portion of 15 mm covering the waveguide, and an interval between the electrodes was 20 μm.

(7) The Mach-Zehnder type optical modulator thus produced was coupled to a laser beam of 10 mW at λ=1550 nm, then a modulation band was 3.0 GHz with a half wavelength voltage of 8 V. In an arrangement of being received waveguide of the laser beam, no variation in the characteristic was found even after 5 hour time had lapsed.

EXAMPLE 6

(1) A (0001) face of an LiTaO₃ monocrystal of a thickness of 2 mm was polished, and then chemically etched. As is the method in the example 1, the resultant was dipped for 5 minutes into a cooled melt. A growth rate of the LiNbO₃ was 1 μm per minute.

(2) A substrate 1 was taken up from the melt, and a surplus melt was shaken away by rotating the substrate at 1000 rpm for 30 seconds. Thereafter, substrate was gradually cooled to the room temperature at a cooling rate of 1° C. per minute. Thus, an LiNbO₃ monocrystalline thin film with Na and Mg contents of a thickness about 5 μm was obtained on the substrate material.

(3) An adjustment of film thickness was performed by grinding the LiNbO₃ monocrystalline thin film to produce an LiNbO₃ monocrystalline thin film having a thickness of 2.8 μm. Next, a ridge type LiNbO₃ monocrystalline waveguide having a width of 5 μm with a level difference of 1.8 μm was formed by the photolithography and ion beam etching technique.

(4) A silica buffer layer was placed on the optical waveguide 2 obtained in the above process by sputtering technique, and aluminium electrode 7 was formed on the waveguide by the photolithography and vapor deposition techniques. The electrode shape was a planar electrode construction having a lengthy portion of 5 mm covering the waveguide, and an interval between the electrodes was 10 μm.

(5) The branch interference type optical modulator thus produced was coupled to a laser beam of 15 mW at λ=633 nm, then a modulation band was 3.5 GHz with a half wavelength voltage of 2 V. In an arrangement of being received waveguide of the laser beam, no variation in the characteristic was found even after 3 hours had lapsed.

EXAMPLE 7

(1) The Mach-Zehnder type optical modulator was produced as is the case of the example 2, but except of a waveguide size and an electrode size.

This waveguide size meant a size of a ridge type LiNbO₃ monocrystalline waveguide of, a width 6 μm, thickness 2.5 μm, and level difference 2.0 μm.

This electrode size included a lengthy portion of 3 mm covering the waveguide, and an interval between the electrodes was 15 μm.

(2) The Mach-Zehnder type optical modulator thus produced was coupled to a laser beam of 10 mW at λ=1300 nm. An applied voltage was adjusted to set so that a phase difference of lights passing through two waveguides might become π/2, where an extinction ratio of 15 dB was observed.

EXAMPLE 8

In the Mach-Zehnder type optical modulator produced by the same method as is the case of example 3, the half wavelength voltage (a voltage for changing a phase difference by π) was measured.

A silica buffer layer of a thickness 1.55 μm was placed on the optical waveguide in the above process by sputtering technique, and then the optical waveguide thus obtained was coupled to laser beam with a wavelength of 1.55 μm TM mode having an interval 40 μm between the electrodes, an operational length 15 mm, as a result of such measurement according to the invention, the half wavelength voltage Vπ was 7.2 V, and this exhibits an improved value by about 10% compared to the conventional Ti diffusion LN waveguide where the half wavelength voltage Vπ was 8.0 V.

COMPARATIVE EXAMPLE 6

(1) Ti with a thickness of approximately 100Å was formed by a photolithography and a sputtering techniques on a Z face portion of an LiNbO₃ monocrystalline plate having a C axis in as a thickness direction and having a size of about 5×15 mm with a thickness of 0.5 mm, a position on such Z face being the same as when the waveguide was formed in the example 1, and thereafter was subjected to thermal treated at 950° C. for several hours within water vapor atomosphere, Ti was thermal diffused, thus the optical waveguide was formed.

(2) An alumina buffer layer was placed on the optical waveguide by sputtering technique, and aluminium electrode was formed on the waveguide by the photolithography and vapor deposition techniques, (3) The Mach-Zehnder type optical modulator thus produced was coupled to a laser beam of 10 mW, at $\lambda = 633$ nm. Then, an optical damage occurred, thus a problem arised in an extent of stability.

COMPARATIVE EXAMPLE 7

(1) A (0001) face of an $LiTaO_3$ monocrystal of a thickness of 2 mm was polished, thereafter a groove was formed by the ion beam etching on a portion where the waveguide 2 shown in FIG. 1 was formed. The groove was a rectangle shape having a width of 8 μm and depth of 1 μm with a branch angle of 1.5°.

(2) A mixture consisting of $Li_2CO_3$ 50 mol %, $V_2O_5$ 40 mol %, and $Nb_2O_5$ 10 mol % was heated to 1000° C. to formed a melt, and thereafter this melt was gradually cooled to 915° C. at a cooling rate of 60° C. per hour, concurrently a substrate 1 was preliminary heated at 915° C., for 30 minutes, and then dipped into the melted body for 8 minutes in a process of being gradually cooled and being rotated at 100 rpm. A growth rate the $LiNbO_3$ was 1 μm per minute.

(3) The substrate 1 was taken up from the melt, and rotated at 1000 rpm for 30 seconds to shake away a surplus melt from substrate. Thereafter, the substrate gradually cooled to the room temperature at a cooling rate of 1° C. per minute. As a result, an $LiNbO_3$ monocrystalline thin film with a thickness of about 8 μm was formed on the substrate material.

(4) A surplus portion of the $LiNbO_3$ monocrystalline thin film was etched by the ion beam to form a ridge type $LiNbO_3$ monocrystalline waveguide 2.

(5) This waveguide 2 was formed immediately thereabove an alumina buffer layer 6 by sputtering, and then vapor deposited with an aluminium electrode 7.

(6) The Mach-Zehnder type optical modulator thus produced was coupled to laser beam of 5 mW, at $\lambda = 550$ nm, a modulation band 2.5 GHz and a half wavelength voltage 8 V were obtained. An extinction ratio was 12 dB.

An applied voltage was varied periodically with a repeated turning-ON and turning-OFF of the laser beam, then an extinction ratio was lowered to 8 dB at the time that two hours has lapsed.

As is apparent from the examples hereinbefore described, the optical modulator according to the invention has an advanced modulation efficiency and a stable amplitude modulation. Since the lattice lengths of the $LiNbO_3$ monocrystalline waveguide 2 and the $LiTaO_3$ monocrystal 1 was matched with each other, then no lattice defect arised in the $LiNbO_3$ monocrystalline waveguide 2, a refractive index of the $LiNbO_3$ monocrystalline waveguide 2 was not changed largely from an original value even when a variation of the refractive index due to an electric field was repeated.

As hereinbefore fully described, the optical waveguide according to the invention is capable of preventing deterioration of an electro-optical constant and upgrading a resistance to the optical damage, and therefore it can be used as a high grade waveguide for the optical device such as an optical modulator, an optical switch and the like, further an optical waveguide exhibiting a high anti-annealing resistance can easily be produced.

The optical device according to the invention can be utilized for an optical modulator and an optical switch thereof which can achieve a stable phase modulation and an optical control even for a high power of light, and since this optical device has a long range service life, then extremely greater effects can be realized in an industrial field.

What is claimed is:

1. A single mode optical waveguide comprising: a $LiTaO_3$ monocrystalline substrate, and a $LiNbO_3$ monocrystalline thin film waveguide formed on a surface of said $LiTaO_3$ monocrystalline substrate, said thin film waveguide having Mach-Zehnder type branched sections on a part of the thin film waveguide, and including at least an Na content in a range of 0.1 to 14.3 mol % and a Mg content in a range of 0.8 to 10.8 mol %, so that lattice lengths of the $LiNbO_3$ monocrystalline thin film waveguide and the $LiTaO_3$ monocrystalline substrate are matched with each other with the following relationship being satisfied;

in the case of TM mode, $$1.9 < (T+0.7)/\lambda < 5.7 \ (T>0)$$

in the case of TE mode, $$0.29 < (T+0.04)/\lambda < 1.19 \ (T>0)$$

where T(μm) represents a thickness of the $LiNbO_3$ monocrystalline thin film waveguide and λ(μm) a wavelength of the guided wave.

2. The single mode optical waveguide as claimed in claim 1, wherein the shape of the optical waveguide satisfies the following relationship;

in the case of TM mode, $$W \leq (4\lambda - 0.5) \times (\lambda^2/\Delta T + 2.0)$$

in the case of TE mode, $$W \leq (0.04\lambda^3 + 0.1\lambda^2)/\Delta T + 2.5\lambda$$

where W(μm) represents a width of the waveguide, ΔT(μm) an etching depth, and λ(μm) a wavelength of the guided wave.

3. The optical waveguide as claimed in claim 1, wherein the $LiNbO_3$ monocrystalline thin film waveguide formed on the surface of the $LiTaO_3$ monocrystalline substrate is an inverted ridge type waveguide.

4. The optical waveguide as claimed in claim 1, wherein the $LiNbO_3$ monocrystalline thin film waveguide formed on the surface of the $LiTaO_3$ monocrystalline substrate is a ridge type waveguide.

5. The optical waveguide as claimed in claim 1, wherein the branched $LiNbO_3$ monocrystalline thin film is formed on a (0001) face of the surface of the $LiTaO_3$ monocrystalline substrate.

6. The optical waveguide as claimed in claim 1, wherein a lattice length of an axis of the $LiTaO_3$ monocrystalline substrate is matched with a lattice length of an axis of the LiNbO₃ monocrystalline thin film.

7. The optical waveguide as claimed in claim 1, wherein a lattice length of the LiNbO₃ monocrystalline thin film is in a range of 99.81 to 100.07% of a lattice length of the LiTaO₃ monocrystalline substrate for matching the lattice lengths with each other.

8. A waveguide device comprising an LiTaO₃ monocrystalline substrate, an LiNbO₃ monocrystalline thin film waveguide formed on a surface of said LiTaO₃ monocrystalline substrate, said thin film waveguide having Mach-Zehnder type branched sections on a part of the thin film waveguide, and an electrode for changing a refractive index of the waveguide provided on at least one of the branched sections, and including at least an Na content in a range of 0.1 to 14.3 mol % and a Mg content in a range of 0.8 to 10.8 mol %, so that lattice lengths of the LiNbO₃ monocrystalline thin film waveguide and the LiTaO₃ monocrystalline substrate are matched with each other with the following relationship being satisfied;

in the case of TM mode, $$1.9 < (T+0.7)/\lambda < 5.7 \ (T>0)$$

in the case of TE mode, $$0.29 < (T+0.04)/\lambda < 1.19 \ (T>0)$$

where T(μm) represents a thickness of the LiNbO₃ monocrystalline thin film waveguide and λ (μm) a wavelength of the guided wave.

9. The waveguide device as claimed in claim 8, wherein said electrode for varying a refractive index of the waveguide comprises a planar electrode.

10. The waveguide device as claimed in claim 8, wherein the LiNbO₃ monocrystalline thin film waveguide formed on the surface of the LiTaO₃ monocrystalline substrate is an inverted ridge type waveguide.

11. The waveguide device as claimed in claim 8, wherein the LiNbO₃ monocrystalline thin film waveguide formed on the surface of the LiTaO₃ monocrystalline substrate is a ridge type waveguide.

12. The waveguide device as claimed in claim 8, wherein the branched LiNbO₃ monocrystalline thin film is formed on a (0001) face of the surface of the LiTaO₃ monocrystalline substrate.

13. The waveguide device as claimed in claim 8, wherein a lattice length of an axis of the LiTaO₃ monocrystalline substrate is matched with a lattice length of an axis of the LiNbO₃ monocrystalline thin film.

14. The waveguide device as claimed in claim 8, wherein a lattice length of the LiNbO₃ monocrystalline thin film is in a range of 99.81 to 100.07% of a lattice length of the LiTaO₃ monocrystalline substrate for matching the lattice lengths with each other.

* * * * *

UNITED STATES PATENT AND TRADEMARK OFFICE
CERTIFICATE OF CORRECTION

PATENT NO. : 5,347,608
DATED : September 13, 1994
INVENTOR(S) : Masanori NAKAMURA et al.

It is certified that error appears in the above-indentified patent and that said Letters Patent is hereby corrected as shown below:

At the cover sheet, item [56], line 1 under other publications. change "Lin-" to ---LiN- ---.
At column 2, line 39, change "Formed" to ---formed on---.
At column 2, line 63, change "that lattice" to ---that a lattice---.
At column 4, line 42, change "illustrates" to ---illustrate---.
At column 4, line 47, change "illustrates" to ---illustrate---.
At column 5, line 12, change "includes step" to ---includes a step---

At column 5, line 13, change "substrate" to ---substrate 1---.
Column 5, line 20, change "substrate" to ---substrate 1,---
At column 6, line 48, change "outpost" to ---output---.
At column 7, line 16, change "silica be" to ---silica may be---.
At column 8, line 2, change "guide" to ---guide 2---.
At column 10, line 35, change "light measured" to ---light was measured---.
At column 11, line 5, change "while with" to ---while---.
At column 12, line 60, change "beam form" to ---beam to form---.
At column 15, line 13, change "substrate" to ---substrate 1---.
At column 15, line 19, change "the by" to ---the---.
At column 15, line 43, change "planer" to ---planar---.

Signed and Sealed this

Twenty-fifth Day of April, 1995

Attest:

BRUCE LEHMAN

*Attesting Officer*     *Commissioner of Patents and Trademarks*